United States Patent
Desjardins et al.

(10) Patent No.: US 12,410,751 B2
(45) Date of Patent: Sep. 9, 2025

(54) AIR INTAKE FOR AN AIRCRAFT PROPULSION SYSTEM ENGINE ASSEMBLY

(71) Applicant: Pratt & Whitney Canada Corp., Longueuil (CA)

(72) Inventors: Michel Desjardins, Saint-Hubert (CA); Guillaume Landry-Drolet, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/372,493

(22) Filed: Sep. 25, 2023

(65) Prior Publication Data

US 2025/0101915 A1 Mar. 27, 2025

(51) Int. Cl.
*F02C 7/055* (2006.01)
*F02C 7/36* (2006.01)

(52) U.S. Cl.
CPC .............. *F02C 7/055* (2013.01); *F02C 7/36* (2013.01); *F05D 2220/323* (2013.01)

(58) Field of Classification Search
CPC .............. F02C 7/04; F02C 7/05; F02C 7/055; B64D 33/02; B64D 2033/0253; B64D 2033/0266; B64D 2033/0286; B64D 2033/0293
See application file for complete search history.

(56) References Cited

U.S. PATENT DOCUMENTS

| | | | | |
|---|---|---|---|---|
| 5,725,180 A | * | 3/1998 | Chamay | F02C 7/04 244/53 B |
| 6,990,798 B2 | * | 1/2006 | Bouchard | F02C 7/04 137/15.1 |
| 9,869,246 B2 | * | 1/2018 | Benz | F01K 23/101 |
| 10,087,839 B2 | * | 10/2018 | Gekht | B64D 33/02 |
| 11,072,435 B2 | * | 7/2021 | Mccage | F02C 7/36 |
| 11,125,158 B2 | * | 9/2021 | Bouldin | F01D 25/10 |
| 2005/0229605 A1 | | 10/2005 | Bouchard | |
| 2013/0087663 A1 | * | 4/2013 | Dailey | B64D 33/02 244/53 B |

(Continued)

FOREIGN PATENT DOCUMENTS

FR 3007798 A1 * 1/2015 ............. B64D 33/02

OTHER PUBLICATIONS

EP search report for EP2420672.2 dated Jun. 3, 2025.

*Primary Examiner* — Alain Chau
(74) *Attorney, Agent, or Firm* — Getz Balich LLC

(57) ABSTRACT

An engine assembly for an aircraft propulsion system includes a gas turbine engine, a gearbox, and a first drive shaft. The gas turbine engine includes an engine output shaft, an air intake, and a compressor. The air intake includes an air intake body forming an air inlet, an air outlet, and an air plenum extending between and connecting the air inlet and the air outlet. The air plenum extends circumferentially about the engine output shaft between and to a first circumferential end of the air intake and a second circumferential end of the air intake. The first circumferential end and the second circumferential end form a circumferential gap. The compressor is connected in fluid communication with the air intake. The gearbox includes a gear assembly operably connected to the engine output shaft. The first drive shaft is operably connected to the gear assembly. The first drive shaft extends through the circumferential gap.

17 Claims, 5 Drawing Sheets

(56) References Cited

U.S. PATENT DOCUMENTS

| | | | | |
|---|---|---|---|---|
| 2014/0360200 | A1* | 12/2014 | Benz | F01K 23/101 |
| | | | | 60/39.182 |
| 2015/0096627 | A1* | 4/2015 | Dailey | B64D 33/02 |
| | | | | 137/15.1 |
| 2016/0003194 | A1* | 1/2016 | Lord | B64D 33/04 |
| | | | | 60/805 |
| 2016/0075439 | A1* | 3/2016 | Mores | F02C 7/052 |
| | | | | 244/53 B |
| 2016/0123228 | A1* | 5/2016 | Couilleaux | B64D 13/06 |
| | | | | 415/144 |
| 2017/0241341 | A1* | 8/2017 | Gekht | F02C 7/04 |
| 2017/0241342 | A1* | 8/2017 | Gekht | F02C 7/042 |
| 2018/0128183 | A1* | 5/2018 | Escure | B64D 35/06 |
| 2018/0328283 | A1* | 11/2018 | Yan | B64D 27/10 |
| 2020/0088097 | A1* | 3/2020 | Bouldin | B64D 33/02 |
| 2020/0130857 | A1* | 4/2020 | Mccage | F02C 7/047 |

* cited by examiner

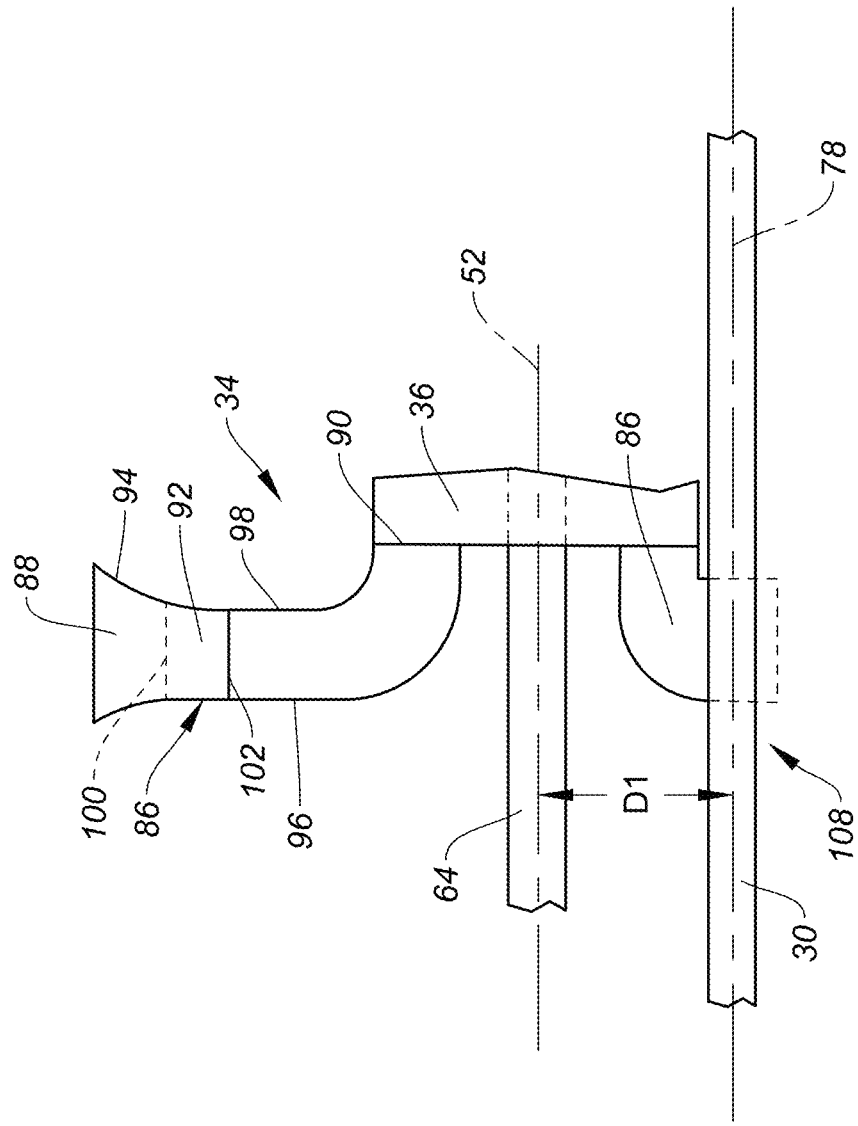
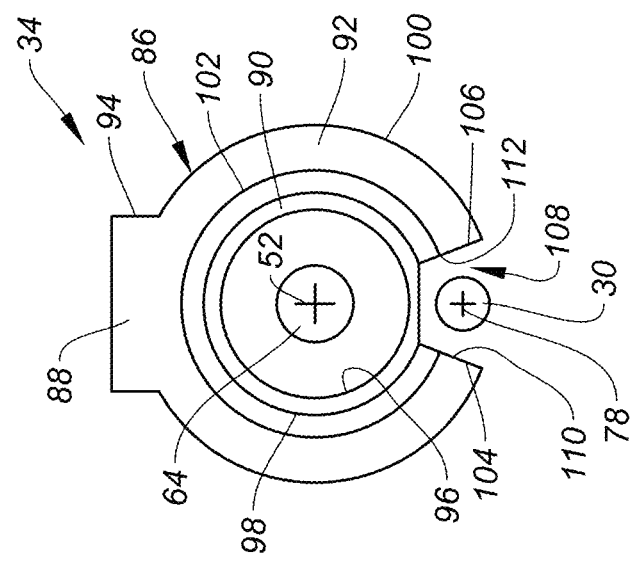
FIG. 5
FIG. 4

AIR INTAKE FOR AN AIRCRAFT PROPULSION SYSTEM ENGINE ASSEMBLY

TECHNICAL FIELD

This disclosure relates generally to engine assemblies configured for aircraft propulsion systems and, more particularly, to an air intake for an engine assembly.

BACKGROUND OF THE ART

A propulsion system for an aircraft may include an air intake configured to direct ambient air into a gas turbine engine of the propulsion system. Various air intake configurations are known in the art for directing air into a propulsion system gas turbine engine. While these known air intakes have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an engine assembly for an aircraft propulsion system includes a gas turbine engine, a gearbox, and a first drive shaft. The gas turbine engine includes an engine output shaft, and air intake, and a compressor. The engine output shaft is configured for rotation about a first rotational axis. The air intake includes an air intake body forming an air inlet, an air outlet, and an air plenum extending between and connecting the air inlet and the air outlet in fluid communication. The air plenum extends circumferentially about the engine output shaft between and to a first circumferential end of the air intake and a second circumferential end of the air intake. The first circumferential end and the second circumferential end form a circumferential gap outside of the air intake and circumferentially between the first circumferential end and the second circumferential end. The compressor is connected in fluid communication with the air intake at the air outlet. The gearbox includes a gear assembly operably connected to the engine output shaft. The first drive shaft is operably connected to the gear assembly. The first drive shaft is rotatable about a second rotational axis. The second rotational axis is radially offset from the first rotational axis. The first drive shaft extends along the second rotational axis through the circumferential gap.

In any of the aspects or embodiments described above and herein, at least a portion of the first drive shaft may be disposed radially inside the air intake body.

In any of the aspects or embodiments described above and herein, the air intake may further include a screen. The screen may extend circumferentially within the air plenum from the first circumferential end to the second circumferential end.

In any of the aspects or embodiments described above and herein, at least a portion of the first drive shaft may be disposed radially inside the screen.

In any of the aspects or embodiments described above and herein, the engine assembly may further include a second drive shaft operably connected to the gear assembly. The second drive shaft may be rotatable about a third rotational axis. The third rotational axis may be radially offset from the first rotational axis.

In any of the aspects or embodiments described above and herein, the third rotational axis and the second rotational axis may be colinear.

In any of the aspects or embodiments described above and herein, the air intake body may form the air inlet at a first circumferential position of the air intake.

In any of the aspects or embodiments described above and herein, the first circumferential end and the second circumferential end may form the circumferential gap at a second circumferential position circumferentially opposite the first circumferential position.

In any of the aspects or embodiments described above and herein, the air intake may include an end strut forming the first circumferential end and the second circumferential end.

In any of the aspects or embodiments described above and herein, the air intake body may include an outer radial wall portion. The outer radial wall portion may be radially offset from the air outlet.

In any of the aspects or embodiments described above and herein, a radial distance between the outer radial wall portion and the air outlet may decrease in a circumferential direction from the air inlet to the first circumferential end and from the air inlet to the second circumferential end.

In any of the aspects or embodiments described above and herein, the air intake may further include at least one guide strut disposed within the air plenum.

According to another aspect of the present disclosure, an air intake for an aircraft propulsion system engine assembly includes an air intake body. The air intake body extends circumferentially about an axis. The air intake body forms an air inlet, an air outlet, and an air plenum extending between and connecting the air inlet and the air outlet in fluid communication. The air plenum extends circumferentially about the axis between and to a first circumferential end of the air intake and a second circumferential end of the air intake. The air intake body includes an air inlet body portion, a first wall portion, a second wall portion, and an outer radial wall portion. The air inlet body portion forms the air inlet at a first circumferential position of the air intake. The first wall portion and the second wall portion extend circumferentially from the air inlet body portion to the first circumferential end. The first wall portion and the second wall portion extend circumferentially from the air inlet body portion to the second circumferential end. The first wall portion and the second wall portion form the air plenum and the air outlet between the first wall portion and the second wall portion. The outer radial wall portion extends along the first wall portion and the second wall portion and further forms the air plenum. The outer radial wall portion extends circumferentially from the air inlet body portion to the first circumferential end. The outer radial wall portion extends circumferentially from the air inlet body portion to the second circumferential end.

In any of the aspects or embodiments described above and herein, the first circumferential end and the second circumferential end may form a circumferential gap outside of the air intake and circumferentially between the first circumferential end and the second circumferential end.

In any of the aspects or embodiments described above and herein, the first circumferential end and the second circumferential end may form the circumferential gap at a second circumferential position circumferentially opposite the first circumferential position.

In any of the aspects or embodiments described above and herein, the air intake may include an end strut extending between and connecting the first wall portion, the second wall portion, and the outer radial wall portion. The end strut may form the first circumferential end and the second circumferential end.

According to another aspect of the present disclosure, an engine assembly for an aircraft propulsion system includes a gas turbine engine and a drive shaft. The gas turbine engine includes an air intake and a compressor. The air intake includes an air intake body extending circumferentially about an axis. The air intake body forms an air inlet, an air outlet, and an air plenum extending between and connecting the air inlet and the air outlet in fluid communication. The air intake body forms the air inlet at a first circumferential position of the air intake. The air plenum extends circumferentially about the axis between and to a first circumferential end of the air intake and a second circumferential end of the air intake. The first circumferential end and the second circumferential end form a circumferential gap outside of the air intake and circumferentially between the first circumferential end and the second circumferential end. The first circumferential end and the second circumferential end form the circumferential gap at a second circumferential position of the air intake circumferentially opposite the first circumferential position. The compressor is connected in fluid communication with the air intake at the air outlet. The drive shaft is rotatable about a rotational axis. The rotational axis is radially offset from the axis. The drive shaft extends along the rotational axis through the circumferential gap.

In any of the aspects or embodiments described above and herein, at least a portion of the drive shaft may be disposed radially inside the air intake body.

In any of the aspects or embodiments described above and herein, the air intake may further include a screen. The screen may extend circumferentially within the air plenum from the first circumferential end to the second circumferential end.

In any of the aspects or embodiments described above and herein, at least a portion of the drive shaft may be disposed radially inside the screen.

The present disclosure, and all its aspects, embodiments and advantages associated therewith will become more readily apparent in view of the detailed description provided below, including the accompanying drawings.

DESCRIPTION OF THE DRAWINGS

FIG. 4 schematically illustrates a front, cutaway view of an air intake for the engine assembly of FIG. 2, in accordance with one or more embodiments of the present disclosure.

FIG. 5 schematically illustrates a side, cutaway view of the air intake of FIG. 4, in accordance with one or more embodiments of the present disclosure.

DETAILED DESCRIPTION

Figure 1:
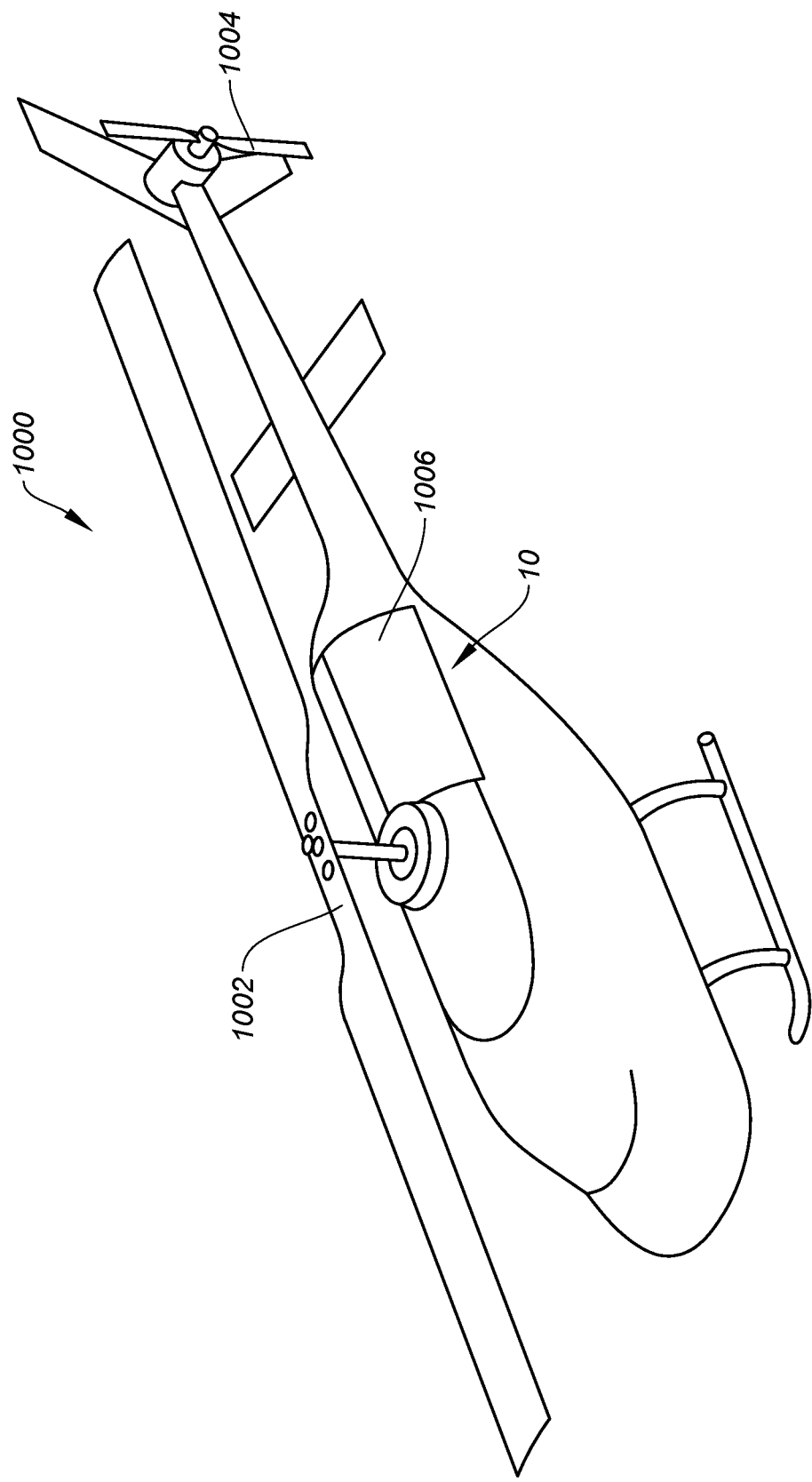
FIG. 1 illustrates a perspective view of an aircraft including a propulsion system, in accordance with one or more embodiments of the present disclosure.

FIG. 1 illustrates a perspective view of an aircraft 1000 including a propulsion system 10. The aircraft 1000 of FIG. 1 is configured as a rotary-wing aircraft (e.g., a helicopter). The present disclosure, however, is also applicable to other configurations of aircraft such as, but not limited to, a fixed-wing aircraft (e.g., an airplane), a tilt-rotor aircraft, a tilt-wing aircraft, or another aerial vehicle. The propulsion system 10 of FIG. 1 is configured to drive rotation of a main rotor 1002 and a tail rotor 1004 of the aircraft 1000 to facilitate propulsion for the aircraft 1000. The aircraft 1000 of FIG. 1 further includes a housing 1006 (e.g., a nacelle, a fuselage, etc.) enclosing and forming a protective outer covering for the propulsion system 10.

Figure 2:
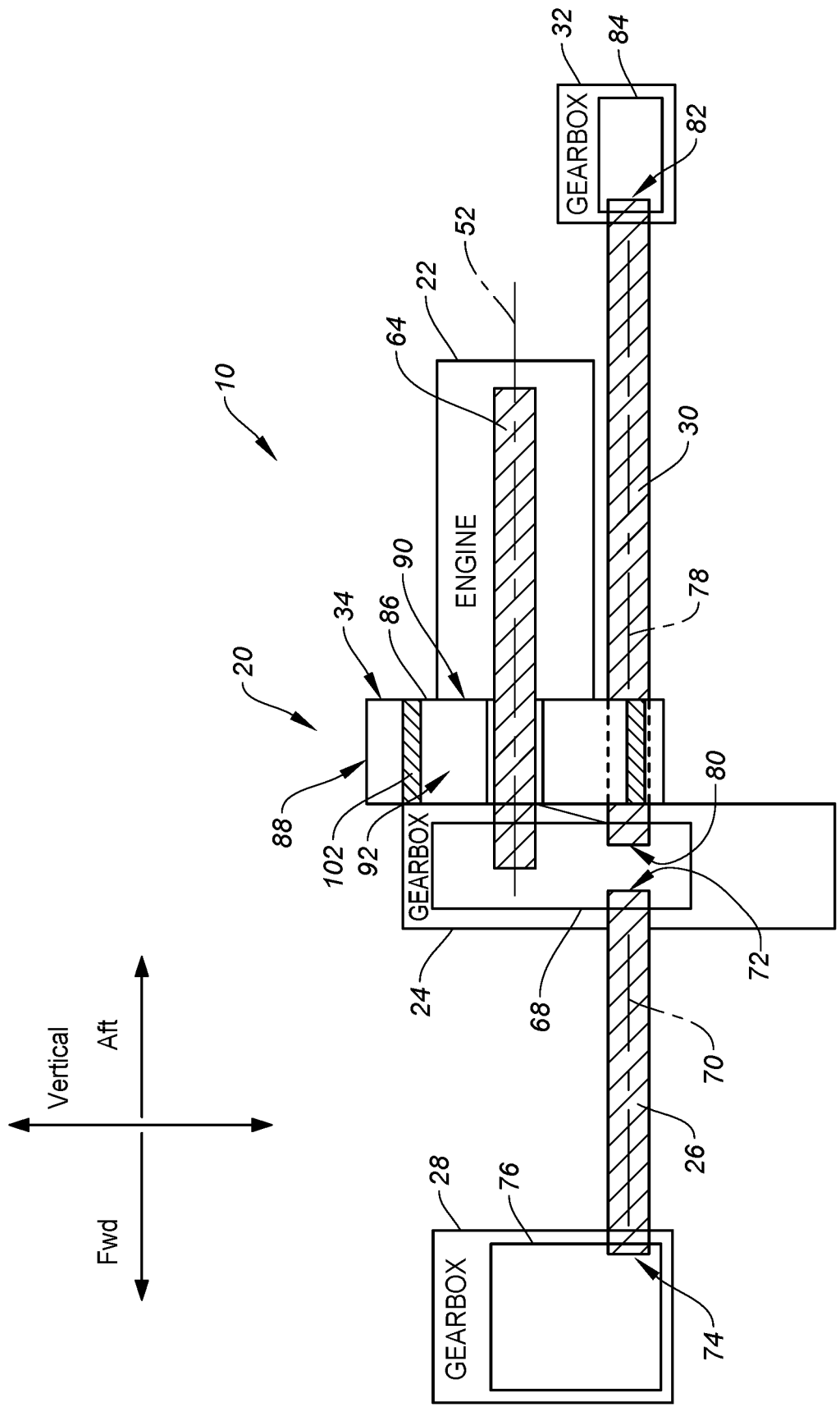
FIG. 2 schematically illustrates a side, cutaway view of an engine assembly for an aircraft propulsion system, in accordance with one or more embodiments of the present disclosure.

FIG. 2 schematically illustrates a cutaway, side view of the propulsion system 10. The propulsion system 10 of FIG. 2 includes an engine assembly 20. The engine assembly 20 includes a gas turbine engine 22, an engine transmission gearbox 24, a main rotor drive shaft 26, a main rotor gearbox 28, a tail rotor drive shaft 30, a tail rotor gearbox 32, and an air intake 34.

Figure 3:
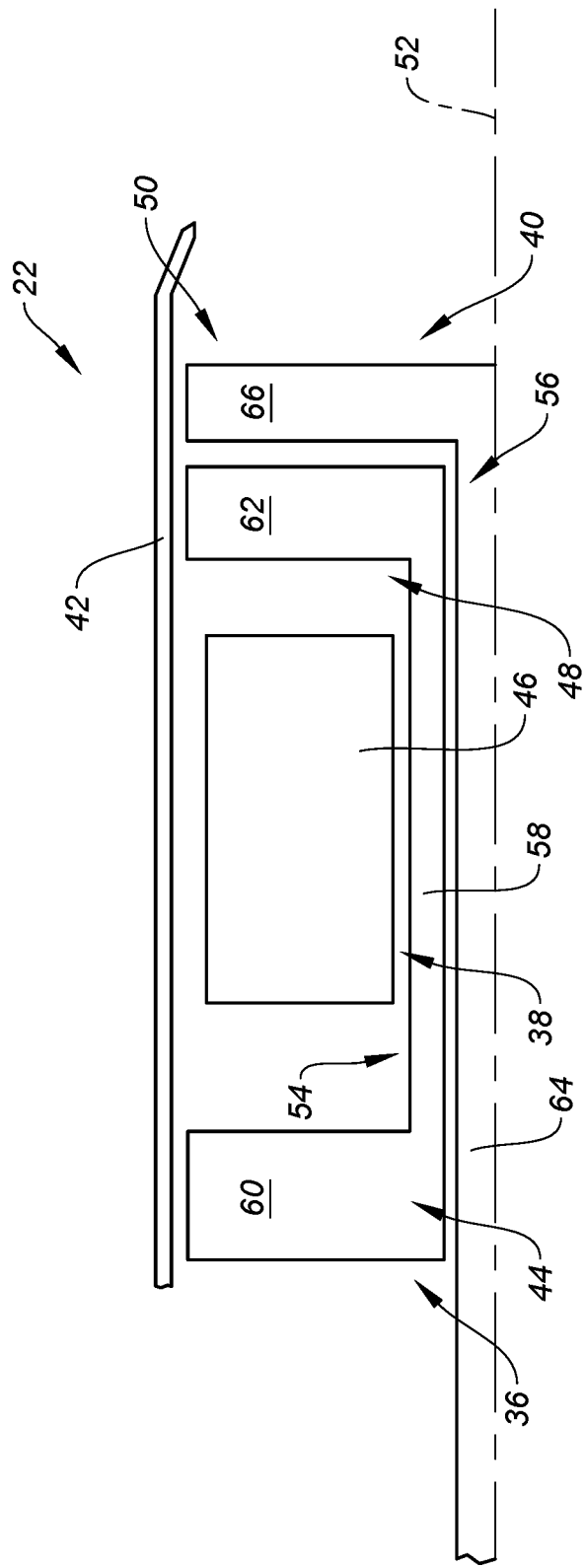
FIG. 3 schematically illustrates a side, cutaway view of a gas turbine engine for an aircraft propulsion system, in accordance with one or more embodiments of the present disclosure.

FIG. 3 schematically illustrates a cutaway, side view of the gas turbine engine 22. The gas turbine engine 22 of FIG. 3 includes a compressor section 36, a combustor section 38, a turbine section 40, and an engine static structure 42. The compressor section 36 includes a compressor 44. The combustor section 38 includes a combustor 46 (e.g., an annular combustor). The turbine section 40 includes a high-pressure turbine 48 and a power turbine 50. The gas turbine engine 22 sections 36, 38, 40 of FIG. 3 are sequentially arranged along an axial centerline 52 (e.g., a rotational axis) of the gas turbine engine 22. The engine static structure 42 may include, for example, one or more engine cases for the gas turbine engine 22. The engine static structure 42 may additionally include cowlings, bearing assemblies, or other structural components of the gas turbine engine 22. The engine static structure 42 houses and structurally supports the engine sections 36, 38, 40.

Components of the engine sections 26, 28, 30 form a first rotational assembly 54 (e.g., a high-pressure spool) and a second rotational assembly 56 (e.g., a power spool). The first rotational assembly 54 and the second rotational assembly 56 are mounted for rotation about the axial centerline 52 relative to the engine static structure 42.

The first rotational assembly 54 includes a first shaft 58, a bladed compressor rotor 60 for the compressor 44, and a bladed first turbine rotor 62 for the high-pressure turbine 48. The first shaft 58 interconnects the bladed compressor rotor 60 and the bladed first turbine rotor 62.

The second rotational assembly 56 includes a second shaft 64 and a bladed second turbine rotor 66 for the power turbine 50. The second shaft 64 is a power shaft (e.g., an engine output shaft) of the gas turbine engine 22. The second shaft 64 interconnects the bladed second turbine rotor 66 with the engine transmission gearbox 24. The first shaft 58 and the second shaft 64 are concentric and configured to rotate about the axial centerline 52. The present disclosure, however, is not limited to concentric configurations of the first shaft 58 and the second shaft 64.

During operation of the gas turbine engine 22, ambient air is directed into the compressor section 36 by the air intake 34. The air is compressed in the compressor 44 by the bladed compressor rotor 60 and directed into a combustion chamber of the combustor 46. Fuel is injected into the combustion chamber and mixed with the compressed air to provide a fuel-air mixture. This fuel-air mixture is ignited and combustion products thereof flow through and sequentially cause the bladed first turbine rotor 62 and the bladed second turbine rotor 66 to rotate. The rotation of the bladed first turbine rotor 62 and the bladed second turbine rotor 66 respectively drives rotation of the first rotational assembly 54 and the second rotational assembly 56.

Referring again to FIG. 2, the engine transmission gearbox 24 of FIG. 2 includes a gear assembly 68. The gear assembly 68 is operably connected to (e.g., coupled with) the second shaft 64, the main rotor drive shaft 26, and the tail rotor drive shaft 30. The gas turbine engine 22 is configured to drive rotation of the main rotor drive shaft 26 and the tail rotor drive shaft 30 with the second shaft 64 through the gear assembly 68. The gear assembly 68 operably connects the second shaft 64, the main rotor drive shaft 26, and the tail rotor drive shaft 30. The gear assembly 68 may be configured, for example, an offset gear assembly, an epicyclic gear assembly (e.g., a planetary gear assembly), or another suitable gear assembly for operably connecting the second shaft 64, the main rotor drive shaft 26, and the tail rotor drive shaft 30. The present disclosure, however, is not limited to any particular gear configuration for the gear assembly 68.

The main rotor drive shaft 26 operably interconnects (e.g., couples) the engine transmission gearbox 24 (e.g., the gear assembly 68) with the main rotor gearbox 28. The main rotor drive shaft 26 may extend in an axially forward direction from the engine transmission gearbox 24 to the main rotor gearbox 28 (e.g., relative to the axial centerline 52). The main rotor drive shaft 26 extends along a rotational axis 70 between and to a first axial end 72 of the main rotor drive shaft 26 and a second axial end 74 of the main rotor drive shaft 26. The main rotor drive shaft 26 is rotatable about the rotational axis 70. The rotational axis 70 may extend parallel to or substantially parallel to the axial centerline 52. The present disclosure, however, is not limited to any particular orientation of the rotational axis 70 relative to the axial centerline 52. The main rotor drive shaft 26 and its rotational axis 70 may be radially offset from the second shaft 64 (e.g., with respect to the axial centerline 52). The main rotor drive shaft 26 may be disposed vertically below the second shaft 64 as shown, for example, in FIG. 2. The present disclosure, however, is not limited to any particular vertical position of the main rotor drive shaft 26 relative to the second shaft 64. As used herein, the term "vertical" and associated orientational language such as "vertically above," "vertically below," "up," and "down" should be understood with respect to a normal attitude of the propulsion system 10. The main rotor drive shaft 26 may be coupled with the gear assembly 68 at (e.g., on, adjacent, or proximate) the first axial end 72. The main rotor drive shaft 26 may be coupled with a gear assembly 76 of the main rotor gearbox 28 at (e.g., on, adjacent, or proximate) the second axial end 74. The gear assembly 76 is further operably connected to (e.g., coupled with) the main rotor 1002 (see FIG. 1) to drive rotation of the main rotor 1002 in response to rotation of the main rotor drive shaft 26.

The tail rotor drive shaft 30 operably interconnects (e.g., couples) the engine transmission gearbox 24 (e.g., the gear assembly 68) with the tail rotor gearbox 32. The tail rotor drive shaft 30 may extend in an axially aft direction from the engine transmission gearbox 24 to the tail rotor gearbox 32 (e.g., relative to the axial centerline 52). As will be discussed in further detail, the tail rotor drive shaft 30 is disposed axially and radially coincident with the air intake 34, relative to the axial centerline 52. The tail rotor drive shaft 30 extends along a rotational axis 78 between and to a first axial end 80 of the tail rotor drive shaft 30 and a second axial end 82 of the tail rotor drive shaft 30. The tail rotor drive shaft 30 is rotatable about the rotational axis 78. The rotational axis 78 may extend parallel to or substantially parallel to the axial centerline 52. The rotational axis 78 may additionally extend parallel to, substantially parallel to, or colinear with the rotational axis 70. The present disclosure, however, is not limited to any particular orientation of the rotational axis 78 relative to the axial centerline 52 or the rotational axis 70. The tail rotor drive shaft 30 and its rotational axis 78 are radially offset from the second shaft 64 (e.g., with respect to the axial centerline 52). The tail rotor drive shaft 30 may be disposed vertically below the second shaft 64 as shown, for example, in FIG. 2. The present disclosure, however, is not limited to any particular vertical position of the tail rotor drive shaft 30 relative to the second shaft 64. The tail rotor drive shaft 30 may be coupled with the gear assembly 68 at (e.g., on, adjacent, or proximate) the first axial end 80. The first axial end 80 may be disposed axially forward of the air intake 34. The tail rotor drive shaft 30 may be coupled with a gear assembly 84 of the tail rotor gearbox 32 at (e.g., on, adjacent, or proximate) the second axial end 82. The second axial end 82 may be disposed axially aft of the air intake 34. The gear assembly 84 is further operably connected to (e.g., coupled with) the tail rotor 1004 (see FIG. 1) to drive rotation of the tail rotor 1004 in response to rotation of the tail rotor drive shaft 30.

The main rotor drive shaft 26 and the tail rotor drive shaft 30 may be formed by a single drive shaft extending through the engine transmission gearbox 24 along the rotational axis 70 and the rotational axis 78 (e.g., colinear rotational axes). Accordingly, the single drive shaft forming the main rotor drive shaft 26 and the tail rotor drive shaft 30 may extend between and to the second axial end 74 and the second axial end 82. The single drive shaft may be coupled with the gear assembly 76 at (e.g., on, adjacent, or proximate) the second axial end 74. The single drive shaft may be coupled with the gear assembly 84 at (e.g., on, adjacent, or proximate) the second axial end 82. The single drive shaft may be coupled with the gear assembly 68 at (e.g., on, adjacent, or proximate) an axially-intermediate portion of the single drive shaft between the second axial end 74 and the second axial end 82.

FIG. 4 schematically illustrates a front, cutaway view of the air intake 34, the second shaft 64, and the tail rotor drive shaft 30. FIG. 5 schematically illustrates a side, cutaway view of the air intake 34, the second shaft 64, the tail rotor drive shaft 30, and portions of the compressor section 36.

The air intake 34 includes an air intake body 86. The air intake 34 may additionally include a screen 102. The air intake body 86 forms an air inlet 88, an air outlet 90, and an air plenum 92 of the air intake 34. The air inlet 88 is disposed at (e.g., on, adjacent, or proximate) an exterior of the propulsion system 10 (see FIG. 2). Ambient air outside the propulsion system 10 enters the air intake 34 at the air inlet 88. The air outlet 90 is disposed at (e.g., on, adjacent, or proximate) the compressor section 36 (e.g., an air inlet of the compressor 44) (see FIG. 3). Air from the air intake 34 flows into the compressor 44 through the air outlet 90. The air plenum 92 extends between and connects the air inlet 88 and the air outlet 90 in fluid communication. The air intake body 86 may be formed by a single (e.g., unitary) component.

Alternatively, the air intake body 86 may include a plurality of components assembled together to form the air intake body 86.

The air intake body 86 of FIGS. 4 and 5 includes an air inlet body portion 94, a first wall portion 96, a second wall portion 98, and an outer radial wall portion 100. The air inlet body portion 94 is disposed at a circumferential position of the air intake 34 (e.g., relative to the axial centerline 52). For example, the air inlet body portion 94 of FIGS. 4 and 5 may be understood to be disposed at a vertical top position (e.g., a 12 o'clock position) of the air intake 34. The air inlet body portion 94 surrounds and forms the air inlet 88 and directs ambient air through the air inlet 88 and into the air plenum 92. The first wall portion 96, the second wall portion 98, and the outer radial wall portion 100 surround and form the air plenum 92. The first wall portion 96, the second wall portion 98, and the outer radial wall portion 100 extend circumferentially from the air inlet body portion 94 to a first circumferential end 104 of air intake 34 and a second circumferential end 106 of the air intake 34, relative to the axial centerline 52. The first wall portion 96 and the second wall portion 98 may curve from a radial orientation toward an axial orientation in a direction from the air inlet 88 to the air outlet 90. For example, the first wall portion 96 may be disposed axially forward of the second wall portion 98 at (e.g., on, adjacent, or proximate) the air inlet 88 and the first wall portion 96 may be disposed radially inward of the second wall portion 98 at (e.g., on, adjacent, or proximate) the air outlet 90. The first wall portion 96 may converge toward the second wall portion 98 in a direction from the air inlet 88 to the air outlet 90, however, the present disclosure is not limited to this particular configuration of the air intake body 86. The outer radial wall portion 100 extends circumferentially along the first wall portion 96 and the second wall portion 98 forming an outer radial boundary of the air plenum 92.

The first circumferential end 104 and the second circumferential end 106 enclose and form opposing circumferential ends of the air plenum 92. The first circumferential end 104 and the second circumferential end 106 form a circumferential gap 108 between the first circumferential end 104 and the second circumferential end 106. In other words, the circumferential gap 108 extends circumferentially between and to the first circumferential end 104 and the second circumferential end 106 outside of the air intake 34. The first circumferential end 104 and the second circumferential end 106 may form the circumferential gap 108 at a circumferential position of the air intake 34 (e.g., relative to the axial centerline 52) which is circumferentially opposite the air inlet body portion 94 and the air inlet 88. For example, the circumferential gap 108 of FIG. 4 may be understood to be disposed at a vertical bottom position (e.g., a 6 o'clock position) of the air intake 34.

The air intake 34 may include an end strut 110 forming the first circumferential end 104 and the second circumferential end 106. The end strut 110 may also form the circumferential gap 108. The end strut 110 may extend between and connect the first wall portion 96, the second wall portion 98, and the outer radial wall portion 100 at (e.g., on, adjacent, or proximate) the first circumferential end 104 to enclose (e.g., seal) the air plenum 92 at the first circumferential end 104. Similarly, the end strut 110 may extend between and connect the first wall portion 96, the second wall portion 98, and the outer radial wall portion 100 at (e.g., on, adjacent, or proximate) the second circumferential end 106 to enclose (e.g., seal) the air plenum 92 at the second circumferential end 106. The end strut 110 may extend radially or substantially radially from the outer radial wall portion 100 toward the axial centerline 52. The present disclosure, however, is not limited to any particular orientation of the end strut 110 relative to the axial centerline 52. The first circumferential end 104 and the second circumferential end 106 may alternatively be formed by portions of the air intake body 86.

The air intake 34 may include the screen 102 disposed within the air plenum 92. The screen 102 may extend circumferentially within the air plenum 92 between and to the first circumferential end 104 and the second circumferential end 106. For example, the screen 102 may extend circumferentially between and to the end strut 110 at (e.g., on, adjacent, or proximate) the first circumferential end 104 and the end strut 110 at (e.g., on, adjacent, or proximate) the second circumferential end 106. The screen 102 may extend axially within the air plenum 92 between and to the first wall portion 96 and the second wall portion 98. The screen 102 is disposed between the air inlet 88 and the air outlet 90 with respect to an air flow path through the air intake 34 and into the compressor section 36 (see FIG. 3). The screen 102 may be formed, for example, by a wire mesh, a perforated plate, or other porous structure configured to prevent larger particulate entering the air inlet 88 from flowing to the air outlet 90.

Referring again to FIGS. 2, 4, and 5, the tail rotor drive shaft 30 extends through the circumferential gap 108 between (e.g., axially between) the first axial end 80 and the second axial end 82. The tail rotor drive shaft 30 is positioned within the circumferential gap 108 and circumferentially adjacent the first circumferential end 104 (e.g., the end strut 110) and the second circumferential end 106 (e.g., the end strut 112). For example, at least a portion of the tail rotor drive shaft 30 disposed in the circumferential gap 108 may be radially inside of the outer radial wall portion 100. For further example, all of the tail rotor drive shaft 30 disposed in the circumferential gap 108 may be radially inside of the outer radial wall portion 100. For further example, at least a portion of the tail rotor drive shaft 30 dispose din the circumferential gap 108 may be radially inside of the screen 102.

The circumferential gap 108 formed by the air intake 34 and the position of the tail rotor drive shaft 30 within the circumferential gap 108 facilitates a reduction in radial distance D1 between the axial centerline 52 and the rotational axis 78 (e.g., the tail rotor drive shaft 30), relative to a conventional air intake which extends fully, circumferentially about (e.g., completely around) an axial centerline and/or engine output shaft of a gas turbine engine. Accordingly, the present disclosure air intake facilitates a more radially-compact engine assembly 20. The more radially-compact engine assembly 20 facilitates a reduction in size and/or material of the housing 1006 (see FIG. 1) and other engine assembly 20 components (e.g., the air intake 34, the engine transmission gearbox 24, etc.), thereby reducing a total weight of the propulsion system 10 and facilitate an improved power-to-weight ratio of the propulsion system 10. Reducing the size of the housing 1006 may further facilitate a reduction in aerodynamic drag for the propulsion system 10 and the aircraft 1000 (see FIG. 1). For conventional air intakes in which the air plenum is fully annular, we have found that an air stagnation region may be formed at a circumferential position opposite the air inlet (e.g., at the vertical bottom or 6 o'clock position). The present disclosure air intake 34 may form the circumferential gap 108 at this position circumferentially opposite the air inlet 88 and, therefore, may have a negligible impact on air flow supplied to the compressor section 36 (see FIG. 3).

Figure 6:
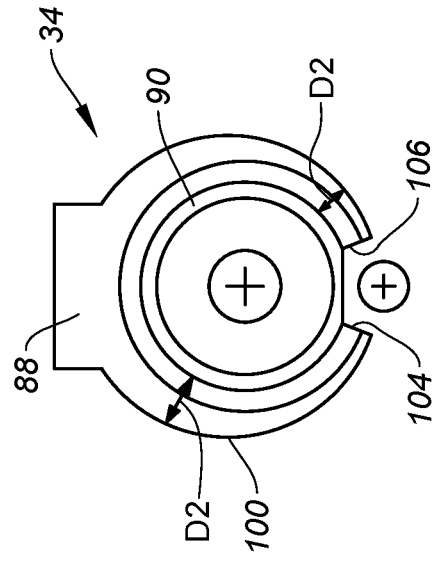
FIG. 6 schematically illustrates a front, cutaway view of another air intake for the engine assembly of FIG. 2, in accordance with one or more embodiments of the present disclosure.

Referring to FIG. 6, in some embodiments, the air intake 34 may be configured with the outer radial wall portion 100 radially offset relative to the air outlet 90. For example, a radial distance D2 between the outer radial wall portion 100 and the air outlet 90 may decrease in a circumferential direction from the air inlet 88 to the first circumferential end 104 and from the air inlet 88 to the second circumferential end 106. This configuration of the air intake 34 of FIG. 6 may facilitate improved air flow distribution at the air outlet 90. In particular, the air intake 34 of FIG. 6 may facilitate more circumferentially uniform air flow supplied to the compressor section 36 (see FIG. 3) (e.g., the compressor entry face) with respect to air pressure, air flow rate, and air swirl.

Figure 7B:
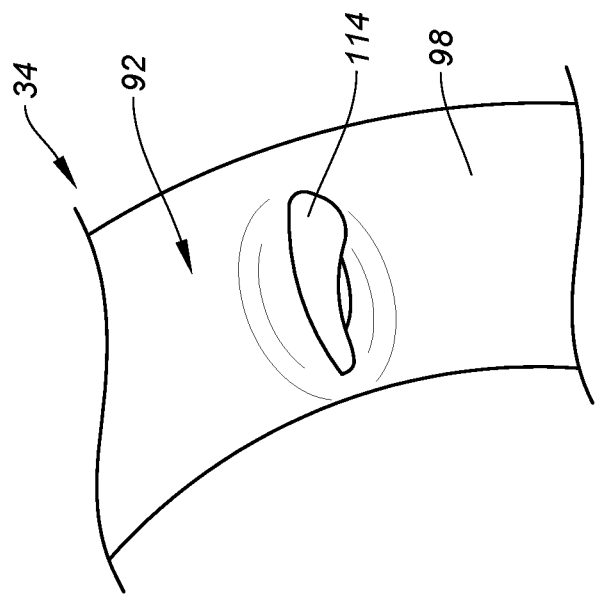
FIGS. 7A-B illustrate perspective, cutaway views of a portion of an air intake including a guide strut, in accordance with one or more embodiments of the present disclosure.
Figure 7A:
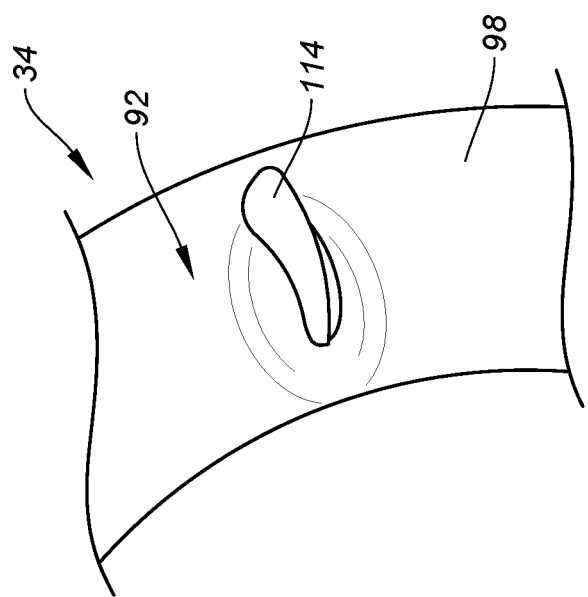

Referring to FIG. 7A-B, in some embodiments, the air intake 34 may include one or more guide struts 114 disposed within the air plenum 92. The guide struts 114 may be formed by or otherwise connected to the air intake body 86. The guide struts 114 may be circumferentially distributed throughout the air plenum 92. FIGS. 7A-B illustrate cutaway views of one of the guide struts 114 projecting outward from the second wall portion 98. Each of the guide struts 114 may extend between and connect the first wall portion 96 and the second wall portion 98 (see FIG. 5). Some or all of the guide struts 114 may extend through the first wall portion 96 and connect to the gearbox 24 (see FIG. 2). For example, the guide struts 114 may be structural struts connecting the gearbox 24 and the gas turbine engine 22 (e.g., the engine static structure 42; see FIG. 3) through the air intake 34. As shown in FIGS. 7A-B, the guide struts 114 may be oriented to induce swirl or otherwise direct air flow in the air plenum 92 in a clockwise or counterclockwise direction to control air flow and air distribution within the air plenum 92.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An engine assembly for an aircraft propulsion system, the engine assembly comprising:
   a gas turbine engine including:
      an engine output shaft configured for rotation about a first rotational axis,
      an air intake including an air intake body forming an air inlet, an air outlet, and an air plenum extending between and connecting the air inlet and the air outlet in fluid communication, the air plenum extends circumferentially about the engine output shaft between and to a first circumferential end of the air intake and a second circumferential end of the air intake, the first circumferential end and the second circumferential end enclosing the air plenum opposite the air inlet relative to the first rotational axis, and the first circumferential end and the second circumferential end form a circumferential gap outside of the air intake and circumferentially between the first circumferential end and the second circumferential end, the circumferential gap located opposite the air inlet relative to the first rotational axis, and
      a compressor connected in fluid communication with the air intake at the air outlet;

a gearbox including a gear assembly operably connected to the engine output shaft; and a first drive shaft operably connected to the gear assembly, the first drive shaft is rotatable about a second rotational axis, the second rotational axis is radially offset from the first rotational axis, and the first drive shaft extends along the second rotational axis through the circumferential gap.

2. The engine assembly of claim 1, wherein at least a portion of the first drive shaft is disposed radially inside the air intake body.

3. The engine assembly of claim 1, wherein the air intake further includes a screen, and the screen extends circumferentially within the air plenum from the first circumferential end to the second circumferential end.

4. The engine assembly of claim 3, wherein at least a portion of the first drive shaft is disposed radially inside the screen.

5. The engine assembly of claim 1, further comprising a second drive shaft operably connected to the gear assembly, the second drive shaft is rotatable about a third rotational axis, and the third rotational axis is radially offset from the first rotational axis.

6. The engine assembly of claim 5, wherein the third rotational axis and the second rotational axis are colinear.

7. The engine assembly of claim 1, wherein the air intake body forms the air inlet at a first circumferential position of the air intake.

8. The engine assembly of claim 1, wherein the air intake includes an end strut forming the first circumferential end and the second circumferential end.

9. The engine assembly of claim 1, wherein the air intake body includes an outer radial wall portion, and the outer radial wall portion is radially offset from the air outlet.

10. The engine assembly of claim 9, wherein a radial distance between the outer radial wall portion and the air outlet decreases in a circumferential direction from:
the air inlet to the first circumferential end; and
the air inlet to the second circumferential end.

11. The engine assembly of claim 1, wherein the air intake further includes at least one guide strut disposed within the air plenum.

12. The engine assembly of claim 1, wherein the engine assembly is enclosed by a housing.

13. The engine assembly of claim 1, wherein the air inlet is disposed radially outward of the air intake.

14. An engine assembly for an aircraft propulsion system, the engine assembly comprising:
a gas turbine engine including:
an air intake including an air intake body extending circumferentially about an axis, the air intake body forms an air inlet, an air outlet, and an air plenum extending between and connecting the air inlet and the air outlet in fluid communication, the air intake body forms the air inlet at a first circumferential position of the air intake, the air plenum extends circumferentially about the axis between and to a first circumferential end of the air intake and a second circumferential end of the air intake, the first circumferential end and the second circumferential end form a circumferential gap outside of the air intake and circumferentially between the first circumferential end and the second circumferential end, and the first circumferential end, the second circumferential end, and the circumferential gap disposed at a second circumferential position of the air intake circumferentially opposite the first circumferential position;
a compressor connected in fluid communication with the air intake at the air outlet; and
a drive shaft, the drive shaft is rotatable about a rotational axis, the rotational axis is radially offset from the axis, and the drive shaft extends along the rotational axis through the circumferential gap.

15. The engine assembly of claim 14, wherein at least a portion of the drive shaft is disposed radially inside the air intake body.

16. The engine assembly of claim 14, wherein the air intake further includes a screen, and the screen extends circumferentially within the air plenum from the first circumferential end to the second circumferential end.

17. The engine assembly of claim 16, wherein at least a portion of the drive shaft is disposed radially inside the screen.

* * * * *